United States Patent
Rajput et al.

(10) Patent No.: US 12,556,512 B2
(45) Date of Patent: Feb. 17, 2026

(54) METHODS, SYSTEMS, AND COMPUTER READABLE MEDIA FOR AUTOMATIC CATEGORY 1 MESSAGE FILTERING RULES CONFIGURATION BY LEARNING TOPOLOGY INFORMATION FROM NETWORK FUNCTION (NF) REPOSITORY FUNCTION (NRF)

(71) Applicant: Oracle International Corporation, Redwood Shores, CA (US)

(72) Inventors: Jay Rajput, Bangalore (IN); Virendra Singh, Bangalore (IN); John Nirmal Mohan Raj, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 357 days.

(21) Appl. No.: 17/902,531

(22) Filed: Sep. 2, 2022

(65) Prior Publication Data

US 2024/0080300 A1 Mar. 7, 2024

(51) Int. Cl.
*H04L 9/40* (2022.01)

(52) U.S. Cl.
CPC ...... *H04L 63/0263* (2013.01); *H04L 63/0281* (2013.01)

(58) Field of Classification Search
CPC .................. H04L 63/0263; H04L 63/0281
See application file for complete search history.

(56) References Cited

U.S. PATENT DOCUMENTS

| | | | |
|---|---|---|---|
| 9,667,596 | B2 | 5/2017 | Halabi |
| 9,705,909 | B2 | 7/2017 | Zaw |
| 10,277,465 | B2 | 4/2019 | Tock et al. |
| 10,484,334 | B1 | 11/2019 | Lee et al. |
| 10,531,305 | B1 | 1/2020 | Verma et al. |
| 10,594,734 | B1 | 3/2020 | Rappard et al. |

(Continued)

FOREIGN PATENT DOCUMENTS

| | | |
|---|---|---|
| CN | 111901367 A | 11/2020 |
| CN | 117321963 B * | 4/2025 |

(Continued)

OTHER PUBLICATIONS

Intent to Grant for European Patent Application Serial No. 22723259.2 (Aug. 26, 2024).

(Continued)

*Primary Examiner* — Rupal Dharia
*Assistant Examiner* — Devin E Almeida
(74) *Attorney, Agent, or Firm* — Jenkins, Taylor & Hunt, P.A.

(57) ABSTRACT

A method for automatic configuration and use of Category 1 message filtering rules includes, at a network function (NF), subscribing, with an NF repository function (NRF), to receive notification of NF profile changes. The method further includes receiving, from the NRF and as a result of the subscribing, notification of an NF profile change. The method further includes automatically configuring, based on the notification of the NF profile change, at least one Category 1 message filtering rule implemented. The method further includes using the at least one Category 1 message filtering rule to filter service based interface (SBI) messages.

18 Claims, 6 Drawing Sheets

(56) References Cited

U.S. PATENT DOCUMENTS

| | | | |
|---|---|---|---|
| 10,601,776 | B1 | 3/2020 | Burakovsky et al. |
| 11,425,636 | B1 | 8/2022 | Aggarwal et al. |
| 11,792,163 | B2 | 10/2023 | Bykampadi |
| 11,843,580 | B2 | 12/2023 | Rajput et al. |
| 12,231,507 | B2 | 2/2025 | Li |
| 12,342,159 | B2 | 6/2025 | Mohan Raj et al. |
| 12,363,075 | B2 | 7/2025 | Rajput et al. |
| 2008/0235507 | A1 | 9/2008 | Ishikawa et al. |
| 2012/0204251 | A1 | 8/2012 | Kopti |
| 2014/0245423 | A1 | 8/2014 | Lee |
| 2019/0230556 | A1* | 7/2019 | Lee .................. H04W 28/16 |
| 2020/0162429 | A1 | 5/2020 | Burakovsky et al. |
| 2020/0162514 | A1 | 5/2020 | Rappard et al. |
| 2020/0314672 | A1 | 10/2020 | Farooq |
| 2021/0168643 | A1 | 6/2021 | Yao et al. |
| 2021/0288942 | A1 | 9/2021 | Preda et al. |
| 2022/0015023 | A1* | 1/2022 | De-Gregorio-Rodriguez ............. H04W 48/18 |
| 2022/0110177 | A1 | 4/2022 | Choksi |
| 2022/0124162 | A1* | 4/2022 | Zhang ............... H04W 24/02 |
| 2022/0247792 | A1 | 8/2022 | Verma et al. |
| 2022/0360561 | A1 | 11/2022 | Rajput et al. |
| 2023/0156549 | A1 | 5/2023 | Tsuda |
| 2023/0179573 | A1 | 6/2023 | Sospovich et al. |
| 2023/0269579 | A1 | 8/2023 | Ma |
| 2023/0319675 | A1 | 10/2023 | Kaur et al. |
| 2023/0328620 | A1 | 10/2023 | Pinheiro et al. |
| 2024/0022910 | A1 | 1/2024 | Li et al. |
| 2024/0057033 | A1* | 2/2024 | Goel .................. H04W 68/02 |
| 2024/0073103 | A1* | 2/2024 | Arends ............. H04L 67/141 |
| 2024/0098490 | A1 | 3/2024 | Wu |
| 2024/0137282 | A1* | 4/2024 | Onno ................ H04L 41/142 |
| 2024/0163660 | A1 | 5/2024 | Mohan Raj et al. |
| 2024/0196193 | A1* | 6/2024 | Kuravangi-Thammaiah ............. H04W 8/20 |
| 2024/0236080 | A1* | 7/2024 | Kuravangi-Thammaiah ............. H04L 63/0807 |
| 2024/0236677 | A1 | 7/2024 | Rajput et al. |
| 2025/0071094 | A1 | 2/2025 | Rajput |

FOREIGN PATENT DOCUMENTS

| | | | | |
|---|---|---|---|---|
| EP | 3886502 | A1 | 9/2021 | |
| KR | 20190088878 | A | 7/2019 | |
| WO | WO-2020030275 | A1 * | 2/2020 | ......... H04L 41/0686 |
| WO | WO-2021/047551 | A1 | 3/2021 | |
| WO | WO-2022069089 | A1 * | 4/2022 | ............. H04L 67/14 |
| WO | WO-2022/235372 | A1 | 11/2022 | |

OTHER PUBLICATIONS

"OAuth 2.0," Swagger, https://swagger.io/docs/specification/authentication/oauth2/, pp. 1-6 (2022).

"3rd Generation Partnership Project; Technical Specification Group Core Network and Terminals; 5G System; Network Function Repository Services; Stage 3 (Release 17)," 3GPP TS 29.510, V17.6.0, pp. 1-306 (Jun. 2022).

"3rd Generation Partnership Project; Technical Specification Group Services and System Aspects; System architecture for the 5G System (5GS); Stage 2 (Release 17)," 3GPP TS 23.501, V17.5.0, pp. 1-568 (Jun. 2022).

"3rd Generation Partnership Project; Technical Specification Group Services and System Aspects; Procedures for the 5G System (5GS); Stage 2 (Release 17)," 3GPP TS 23.502, V17.4.0, pp. 1-738 (Mar. 2022).

"3rd Generation Partnership Project; Technical Specification Group Core Network and Terminals; 5G System; Public Land Mobile Network (PLMN) Interconnection; Stage 3 (Release 17)," 3GPP TS 29.573, V17.4.0, pp. 1-106 (Mar. 2022).

"5G Interconnect Security," GSMA, Version 2.0, pp. 1-61 (Jun. 3, 2021).

Non-Final Office Action for U.S. Appl. No. 17/308,018 (Jan. 20, 2023).

Commonly-Assigned, co-pending U.S. Appl. No. 18/236,921 for "Methods, Systems, and Computer Readable Media for Automatically Updating Firewall Rules to Filter Service-Based Interface (SBI) Messages Relating to New or Updated Services" (Unpublished, filed Aug. 22, 2023).

Notification of Transmittal of the International Search Report and the Written Opinion of the International Searching Authority, or the Declaration for International Application No. PCT/US2022/023812 (Jul. 22, 2022).

Commonly-Assigned, Co-pending U.S. Appl. No. 17/308,018 for "Methods, Systems, and Computer Readable Media for Platform Firewall Management by Network Function (NF) Repository Function (NRF) or Service Communications Proxy (SCP)," (Unpublished, filed May 4, 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

"Functionality to be Deployed in Different Locations," Ericsson, https://www.ericsson.com/en/future-technologies/architecture/network-architecture-domains, pp. 1-20 (2021).

"3rd Generation Partnership Project; Technical Specification Group Services and System Aspects; Security Aspects; Study on security aspects of the 5G Service Based Architecture (SBA) (Release 16)," 3GPP TR 33.855, V16.1.0, pp. 1-103 (Sep. 2020).

Dredge, "The Service Communication Proxy: 5G Caught Up in a Service Mesh," Metaswitch, pp. 1-10 (Feb. 14, 2020).

Girondi, "Efficient Traffic Monitoring in 5G Core Network," KTH Royal Institute of Technology, pp. 1-118 (2020).

"Ultra Cloud Core 5G Policy Control Function, Release Mar. 2020—Configuration and Administration Guide," Cisco, https://www.cisco.com/c/en/us/td/docs/wireless/ucc/pcf/2020-03-0/b_ucc-5g-pcf-config-and-admin-guide_2020-03/m_5g-pcf-overview.html#id_121328 , pp. 1-7 (Mar. 2020).

Salva-Garcia et al., "5G NB-IoT: Efficient Network Traffic Filtering for Multitenant IoT Cellular Network," Security and Communications Networks, vol. 2018, pp. 1-22 (2018).

"Making 5G a Reality," NEC Corporation, pp. 1-32 (2018).

El-Atawy et al., "An Automated Framework for Validating Firewall Policy Enforcement," Eighth IEEE International Workshop on Policies for Distributed Systems and Networks Jun. 25, 2007.

Gomez et al., "Security policies definition and enforcement utilizing policy control function framework in 5G," Computer Communications 172 (2021) 226-237.

Salva-Garcia, P. et al., "Towards Automatic Deployment of Virtual Firewalls to Support Secure mMTC in 5G Networks," IEEE Infocom 2019—IEEE Conference on Computer Communications Workshops (INFOCOM WKSHPS), pp. 385-390, 2019.

Wehbe, N., et al., "A Security Assessment of HTTP/2 Usage in 5G Service-Based Architecture," in IEEE Communications Magazine, vol. 61, No. 1, pp. 48-54, Jan. 2023.

Multiprotocol Signaling Firewall—Mobileum 2020.

Security Edge Protection Proxy (SEPP)—Mobileum 2020.

Security Edge Protection Proxy (SEPP)—Broadforward Jun. 6, 2023.

3rd Generation Partnership Project; Technical Specification Group Core Network and Terminals; 5G System; Network Function Repository Services; Stage 3 (Release 18) 3GPP TS 29.510 V18.3.0 (Jun. 2023).

5G Interconnect Security; GSMA FS.36; Version 2.0 (Jun. 3, 2021).

3rd Generation Partnership Project; Technical Specification Group Core Network and Terminals; 5G System; Technical Realization of Service Based architecture; Stage 3 (Release 18) 3GPP TS 29.500 V18.2.0 (Jun. 2023).

(56) References Cited

OTHER PUBLICATIONS

3rd Generation Partnership Project; Technical Specification Group Core Network and Terminals; 5G System; Principles and Guidelines for Services Definition; Stage 3 (Release 18) 3GPP TS 29.501 V18.2.0 (Jun. 2023).
3rd Generation Partnership Project; Technical Specification Group Services and System Aspects; Security Architecture and Procedures for the 5G System (Release 18) 3GPP TS 33.501 V18.2.0 (Jun. 2023).
YAML, https://en.wikipedia.org/wiki/YAML; last updated Jul. 31, 2023.
API Firewall—API Firewall (42crunch.com) 2023.
Notice of Allowance and Fee(s) Due for U.S. Appl. No. 17/308,018 (Aug. 2, 2023).
Commonly-Assigned, co-pending U.S. Appl. No. 17/984,287 for "Methods, Systems, and Computer Readable Media for Providing Shared Security Edge Protection Proxy (SEPP) for Roaming Aggregators" (Unpublished, filed Nov. 10, 2022).
Alcala-Marin et al., "Global Mobile Network Aggregators: Taxonomy, Roaming Performance and Optimization," ACM, pp. 1-13 (2022).
International Search Report and Written Opinion for Appl No. PCT/US2023/031707 dated Dec. 14, 2023.
3GPP TSG-SA WG2 Meeting #128 Bis S2-187949 (Aug. 24, 2018).
Office Action for Chinese Patent Application Serial No. 202280032824.X (Sep. 1, 2024).
Non-Final Office Action for U.S. Appl. No. 17/984,287 (Sep. 28, 2024).
Notification to Grant for Chinese Patent Application Serial No. 202280032824.X (Mar. 4, 2025).
Notice of Allowance for U.S. Appl. No. 17/984,287 (Mar. 11, 2025).
Bringhenti, Daniele, et al. "Automated firewall configuration in virtual networks." IEEE Transactions on Dependable and Secure Computing 20.2: 1559-1576. (Year: 2022).
Compaste, Maxime, et al. "Palantir: An nfv-based security-as-a-service approach for automating threat mitigation." Sensors 23.3 1658. (Year: 2023).
Notice of Allowance for U.S. Appl. No. 18/236,921 (May 29, 2025).
"3GPP TSG-CT WG4 Meeting #98e" C4-203235, Jun. 2020.
Office Action for Chinese Patent Application Serial No. 202380062872.8 (Jun. 21, 2025).
Notice of Allowance for Chinese Patent Application Serial No. 202380062872.8 (Oct. 31, 2025).

* cited by examiner

METHODS, SYSTEMS, AND COMPUTER READABLE MEDIA FOR AUTOMATIC CATEGORY 1 MESSAGE FILTERING RULES CONFIGURATION BY LEARNING TOPOLOGY INFORMATION FROM NETWORK FUNCTION (NF) REPOSITORY FUNCTION (NRF)

TECHNICAL FIELD

The subject matter described herein relates to automatically configuring Category 1 message filtering rules. More particularly, the subject matter described herein relates to methods, systems, and computer readable media for automatic Category 1 message filtering rules configuration by learning topology information from the NRF.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other types of networks is that there is a need for Category 1 message filtering at the SEPP or SCP, and manual configuration of Category 1 message filtering rules is labor intensive and subject to human error. GSMA FS.36, 5G Interconnect Security Version 2.0 Section 3.4.5 suggests Category 1 message filtering on resource URI and HTTP method of custom operation screening within an N32fReformattedReqMsg and N32fRefirnatttedRespMsg to secure the 5GC network. FS.36 defines Category 1 message filtering as unauthorized packet filtering at the interface level (see Section 3.4.3). The purpose of Category 1 message filtering is to prevent unauthorized external access to internal interfaces. The messages that can be filtered using Category 1 message filtering rules at the SEPP or SCP include service based interface (SBI) messages seeking to access services provided by NFs.

One approach to Category 1 message filtering is to create whitelists with specific interfaces, as well as resource URI and HTTP methods/custom operations. The recommended practice for Category 1 filtering is to block all 5G interconnect messages except those explicitly required for a given interface, and to allow/activate on the SEPP only the required interface(s) for mobile network operator (MNO) usage scenarios. This also avoids the risk that roaming partners extend roaming services or features unilaterally by using interfaces and sending messages that are not covered by the existing roaming agreement. In general, the SEPP needs to be able to differentiate between the different interfaces and methods encapsulated in the N32-f packets and treat them separately.

Whitelists can be deployed with different levels of precision. For example, whitelists can be deployed based on roaming partner, peer SEPP, resource URI, HTTP method/ custom operation or even based on information element (IE) level and flags. The more precise the whitelist is, the more difficult it will be to launch an attack. More precise filtering also requires more detailed administration.

Category 1 message filtering can be implemented at the SEPP as SEPP is the entry point for the PLMN. One of the challenge is to keep this configuration in sync with resource URI and HTTP methods supported by the producers of the PLMN.

Accordingly, in light of these and other difficulties, there exists a need for improved methods, systems, and computer readable media for configuring Category 1 message filtering rules.

SUMMARY

A method for automatic configuration and use of Category 1 message filtering rules is provided. The method includes, at a network function (NF), subscribing, with an NF repository function (NRF), to receive notification of NF profile changes. The method further includes receiving, from the NRF and as a result of the subscribing, notification of an NF profile change. The method further includes automatically configuring, based on the notification of the NF profile change, at least one Category 1 message filtering rule. The method further includes using, at the NF, the at least one Category 1 message filtering rule to perform Category 1 message filtering of service based interface (SBI) messages.

According to another aspect of the subject matter described herein, the NF comprises a security edge protection proxy (SEPP).

According to another aspect of the subject matter described herein, the NF comprises a service communication proxy (SCP).

According to another aspect of the subject matter described herein, subscribing with the NRF includes transmitting an nfStatusSubscribe message to the NRF.

According to another aspect of the subject matter described herein, receiving notification of the NF profile change includes receiving an nfStatusNotify message containing an NF profile.

According to another aspect of the subject matter described herein, receiving notification of the NF profile change includes receiving the notification in response to an NFRegister, NFUpdate, or NFDeregister service operation.

According to another aspect of the subject matter described herein, the NF profile includes an authorization attribute and automatically configuring the at least one Category 1 message filtering rule includes adding or updating a Category 1 message filtering rule to allow SBI messages containing hypertext transfer protocol (HTTP) methods corresponding to allowed scopes for an entity defined in the authorization attribute.

According to another aspect of the subject matter described herein, the authorization attribute scopes specify allowed operations the entity.

According to another aspect of the subject matter described herein, automatically configuring the at least one Category 1 message filtering rule includes automatically adding a Category 1 message filtering rule to a Category 1 message filtering rules database maintained by the NF.

According to another aspect of the subject matter described herein, using the Category 1 message filtering rule to filter SBI messages includes allowing or blocking SBI messages arriving in a public land mobile network (PLMN) based on hypertext transfer protocol (HTTP) method type and resource uniform resource identifier (URI) parameters in the messages.

According to another aspect of the subject matter described herein, system for automatic configuration and use of Category 1 message filtering rules is provided. The system includes a network function (NF) including at least one processor and a memory. The system further includes a Category 1 message filtering rules database stored in the memory. The system further includes a Category 1 message filtering rules manager executable by the at least one processor for subscribing, with an NF repository function (NRF), to receive notification of NF profile changes, receiving, from the NRF and as a result of the subscribing, notification of an NF profile change, automatically configuring, based on the notification of the NF profile change, at least one Category 1 message filtering rule in the Category 1 message filtering rules database; and using the at least one Category 1 message filtering rule to filter service based interface (SBI) messages.

According to another aspect of the subject matter described herein, the Category 1 message filtering rules manager is configured to subscribe with the NRF by transmitting an nfStatusSubscribe message to the NRF.

According to another aspect of the subject matter described herein, the Category 1 message filtering rules manager is configured to receive the notification of the NF profile change in an nfStatusNotify message containing an NF profile.

According to another aspect of the subject matter described herein, the Category 1 message filtering rules manager is configured to receive the notification of the NF profile change in response to an NFRegister, NFUpdate, or NFDeregister service operation.

According to another aspect of the subject matter described herein, the NF profile includes an authorization attribute and wherein the Category 1 message filtering rules manager is configured to automatically add or update a Category 1 message filtering rule to allow hypertext transfer protocol (HTTP) methods corresponding to allowed scopes for the entity defined in the authorization attribute.

According to another aspect of the subject matter described herein, the Category 1 message filtering rules manager is configured to allow or block messages arriving in a public land mobile network (PLMN) based on hypertext transfer protocol (HTTP) method type and resource uniform resource identifier (URI) parameters in the messages.

According to another aspect of the subject matter described herein, a non-transitory computer readable medium having stored thereon executable instructions that when executed by a processor of a computer control the computer to perform steps is provided. The steps are performed at a network function (NF. The steps include subscribing, with an NF repository function (NRF), to receive notification of NF profile changes. The steps further include receiving, from the NRF and as a result of the subscribing, notification of an NF profile change. The steps further include automatically configuring, based on the notification of the NF profile change, at least one Category 1 message filtering rule. The steps further include using the at least one Category 1 message filtering rule to filter service based interface (SBI) messages.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
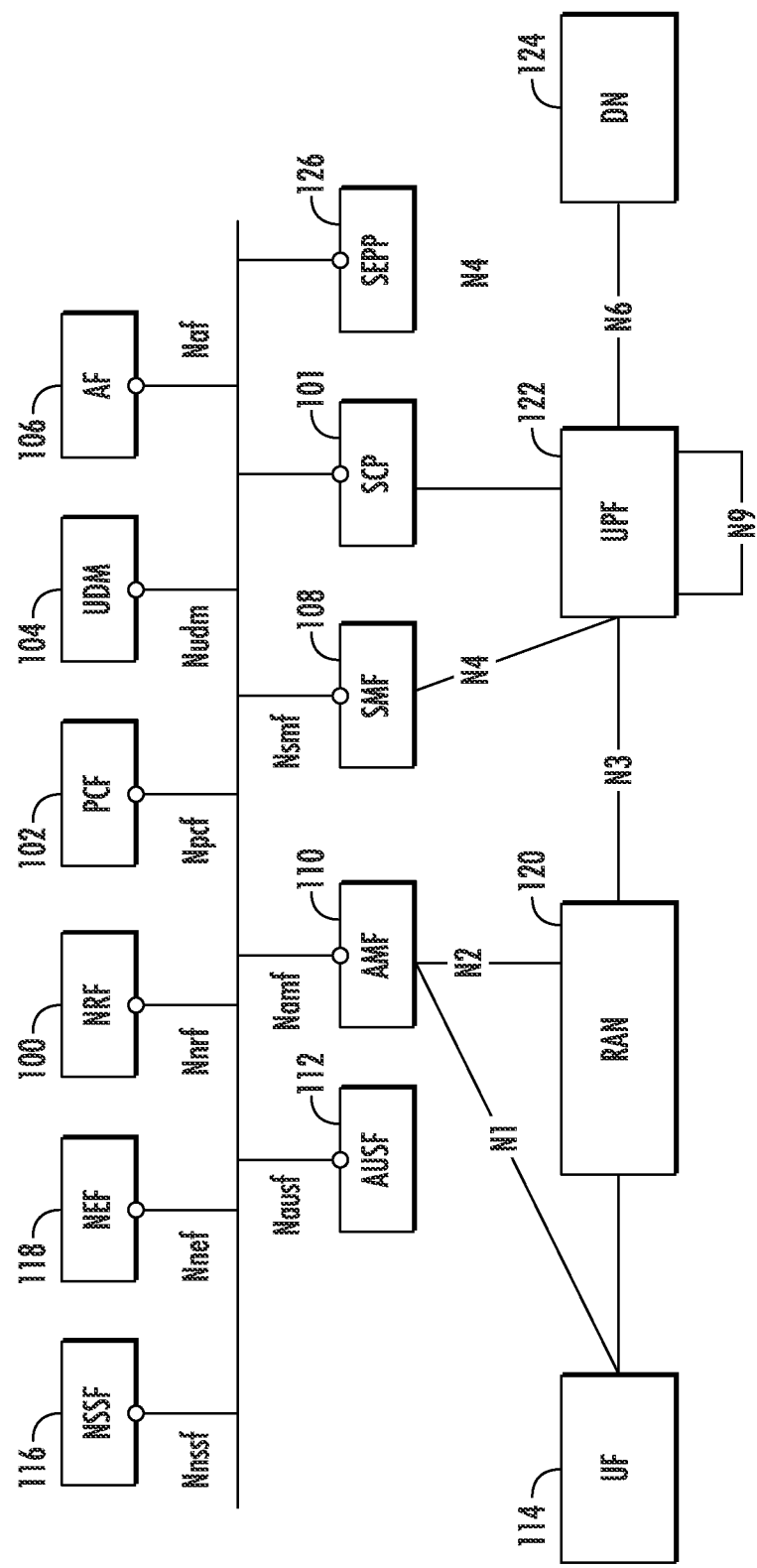
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between application and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem with the current filtering in 5G and other networks is that manually configuring Category 1 message filtering rules at the SEPP or SCP is labor intensive and subject to human error. GSMA FS.36 Version 2 Section 3.4.5 suggests Category 1 message filtering on custom operations to secure the network. Category 1 message filtering is based on resource URI and HTTP method type and can be implemented at the SEPP, as the SEPP is the entry point to the PLMN. Category 1 message filtering can also be implemented at the SCP, as the SCP is a routing node used to distribute messages within 5G networks.

The subject matter described herein includes a mechanism to automate the configuration for Category 1 message filtering at the SEPP or SCP by learning the producer NF profiles registered with the NRF and extracting the required information from the profiles to configure the Category 1 message filtering rules to reduce operational overhead and improve the security of 5GC network by reducing the likelihood of human errors.

As mentioned above, producer NFs register their NF profiles with the NRF. The NF profiles include authorization attributes that may be used as topology information to configure Category 1 message filtering rules. Two of these authorization attributes are the allowedOperationsPerNfType attribute and the allowedOperationsPerNfInstance attribute. 3GPP TS 29.510 version 17.5.0 Section 6.1.6.2.3 defines allowedOperationsPerNfType and allowedOperationsPerNfInstance which defines an array of allowed scopes. Scopes that can be mapped to a resource URI and method can be used to create Category 1 message filtering rules. Scopes are defined in individual API specifications and explained in further detail below. Table 1 shown below from 3GPP TS 29.510 defines the AllowedOperationsPerNfType and allowedOperationsPerNfInstance attributes:

TABLE 1

NF Profile Attributes Usable to Configure Category 1 Message Filtering Rules

| Attribute name | Data type | P | Cardinality | Description |
| --- | --- | --- | --- | --- |
| allowedOperationsPerNfType | map(array(string)) | O | 1 ... N(1 ... M) | Map of allowed operations on resources |

TABLE 1-continued

NF Profile Attributes Usable to Configure Category 1 Message Filtering Rules

| Attribute name | Data type | P | Cardinality | Description |
|---|---|---|---|---|
| | | | | for each type of NF; the key of the map is the NF Type, and the value is an array of scopes. The scopes shall be any of those defined in the API that defines the current service (identified by the "serviceName" attribute). (NOTE 11) |
| allowedOperationsPerNfInstance | map(array(string)) | O | 1 ... N(1 ... M) | Map of allowed operations on resources for a given NF Instance; the key of the map is the NF Instance Id, and the value is an array of scopes. The scopes shall be any of those defined in the API that defines the current service (identified by the "serviceName" attribute). (NOTE 11) |

From Table 1, the allowedOperationsPerNfType attribute stores values that define allowed operations or scopes for a given NF type. Such attribute values can be used in Category 1 message filtering rules that filter SBI messages based on HTTP method attribute values carried in the messages, such as PUT, POST, PATCH, GET, etc. The allowedOperationsPerNfInstance attribute stores values that define allowed operations or scopes for an NF instance. These values can also be used in Category 1 message filtering rules that filter SBI messages based on HTTP method attribute values at the NF instance level.

Other authorization attributes that can be used to define allowed operations or scopes for entities include allowedPlmns, allowedNfTypes, allowedNfDomains, allowedNssais, etc. Further, there can be vendor specific (i.e., non-3GPP-defined attributes) which can be defined for authorization. Any authorization attributes specified in an NF profile can be used to automatically provision and/or update Category 1 message filtering rules.

The following is an example of allowed NF scopes that may be defined for different NF types seeking to access a UDM. The NF Open API specification can be used to define allowed scopes on interfaces, such as the N32 interface, that use OAuth2 authentication. Scopes are access rights that control whether the consumer NF is allowed to perform the needed call to the producer NF. In the example below, the value of the key in the scopes map is hidden using three dots for clarity. Additional information regarding the OAuth2 scopes can be found at:

https://swagger.io/docs/specification/authentication/oauth2/

Scopes Example

```
components:
  securitySchemes:
    oAuth2ClientCredentials:
      type: oauth2
      flows:
        clientCredentials:
          tokenUrl: '{nrfApiRoot}/oauth2/token'
          scopes:
            nudm-uecm: Access to the nudm-uecm API
```

```
c:write: ...
nudm_uecm:smf-registration:write: ...
nudm_uecm:smsf-registration:write: ...
nudm_uecm:ip-sm-gw-registration:write: ...
nudm_uecm:nwdaf-registration:write: ...
```

In the example above, allowed scopes are defined for different NF types for the nudm-uecm API. The scopes allow write access on the nudm-uecm API for AMF, SMF, short message service function (SMSF), IP short message gateway (IP-SM-GW), and network data analytics function (NWDAF) registration procedures. An SEPP or SCP that performs automatic Category 1 message filtering rules configuration as described herein may map the write access to HTTP methods, such as POST, to allow the identified NF types to send SBI messages containing HTTP POST methods in the PLMN. The following table illustrates an example of Category 1 message filtering rules that may be automatically configured based on the allowed OAuth2 scopes above:

TABLE 2

Example Category 1 Message Filter Rules

| Interface Name | Allowed HTTP Method(s) |
|---|---|
| nudm_uecm:smf-registration | POST |
| nudm_uecm:smsf-registration | POST |
| nudm_uecm:ip-sm-gw-registration | POST |
| nudm_uecm:nwdaf-registration | POST |

In Table 2, the Category 1 message filtering rules defined for the nudm-uecm registration API allows HTTP POST operations. It is understood that HTTP operations other than those expressly allowed would be denied. For example a message attempting an HTTP GET operation on the nudm_uecm:smf-registration interface would be denied.

The Category 1 message filtering rule configuration needs to be kept in sync with the resource URIs and HTTP methods supported by the producers of the PLMN. The manual procedure is error prone and increases operational overhead. There is a need to reduce operational overhead by automating the Category 1 message filtering rule configuration at the SEPP. The operator must configure Category 1 message filtering rules, and when an NF Profile configuration is updated to add allowed operations on an interface, the Category 1 message filtering rules at the SEPP must also be updated. According to an aspect of the subject matter described herein, the SEPP subscribes with the NRF for NF profile changes. Any changes in the NF profile is communicated to the SEPP, which on receiving such notification, uses the scope details provided in the NF profile to create one or more Category 1 message filtering rules.

Figure 2:
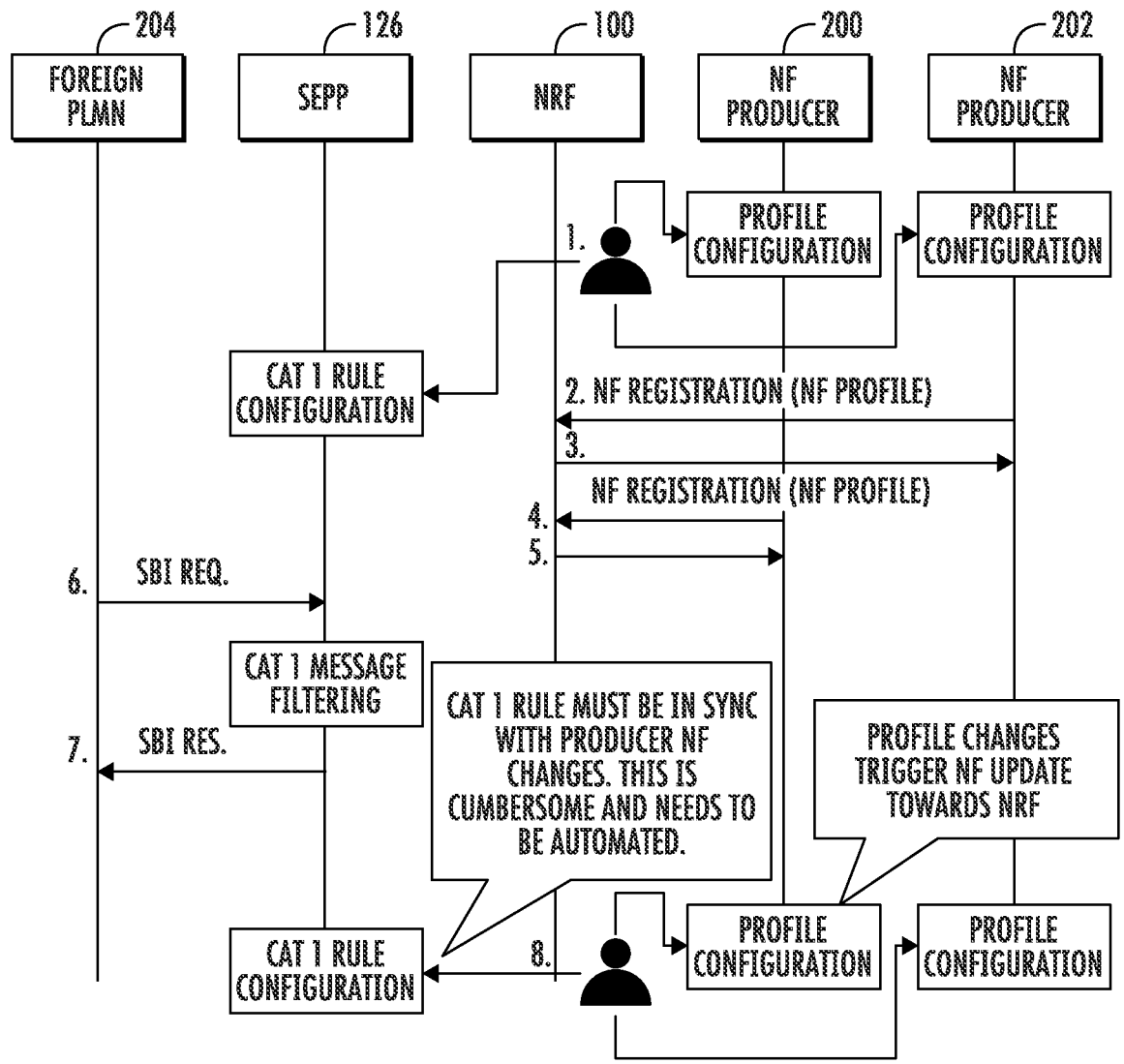
FIG. 2 is a message flow diagram illustrating manual configuration of Category 1 message filtering rules at the SEPP.

Before describing the messaging associated with automatic configuring of Category 1 message filters, exemplary messaging associated with manually configuring Category 1 message filters will be described with respect to FIG. 2. Referring to FIG. 2, in line 1, a user manually configures the NF profile of NF producers 200 and 202 and also manually configures at Category 1 message filtering rule for NF producers 200 and 202 with SEPP 126.

In line 2, NF producer 202 transmits an NF register request to NRF 100 to register its NF profile with NRF 100. The NF register service operation is successful, and NRF 100 responds with a 201 Created message in line 3.

In line 4, NF producer 200 transmits an NF register request to NRF 100 to register its NF profile with NRF 100. The NF register service operation is successful, and NRF 100 responds with a 201 Created message in line 5.

In line 6, a foreign PLMN 204 transmits an SBI request message requesting service from one of the NFs in the PLMN protected by SEPP 126. In this example, the message is assumed to be blocked by a Category 1 message filtering rule. SEPP 126 responds as indicated in line 7 with an SBI response message indicating that the message has been blocked.

In line 8, the network operator manually updates the NF profiles of NF producers 200 and 202. The network operation is also required to manually update Category 1 message filtering rules based on the changes to the NF profile. Such manual configuration of Category 1 message filtering rules is prone to error and therefore undesirable.

Figure 3:
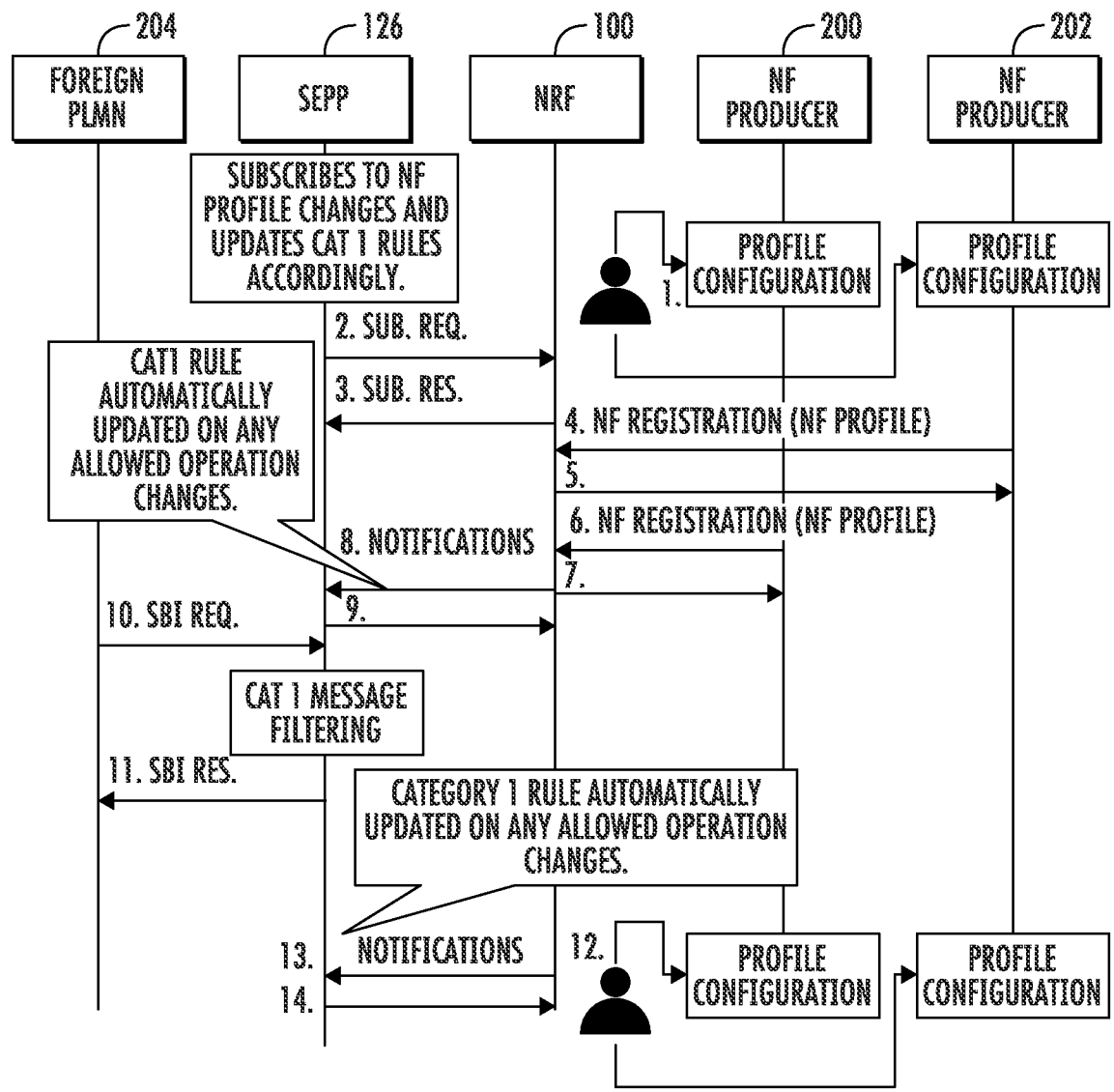
FIG. 3 is a message flow diagram illustrating automatic configuration of Category 1 message filtering rules at the SEPP by learning topology information from the NRF.

FIG. 3 is a message flow diagram illustrating automatic configuration of Category 1 message filtering rules at the SEPP by learning topology information from the NRF. Referring to FIG. 3, in line 1, an operator configures NFs 200 and 202 with their NF profiles. In line 2, SEPP 126 transmits an nfStatusSubscribe message to NRF 100 to subscribe to receive notification of changes in NF profiles maintained by NRF 100. In line 3, NRF 100 responds with a 201 Created message indicating successful creation of the subscription.

In line 4, NF producer 202 transmits an NF register request to NRF 100 to register its NF profile with NRF 100. The NF register service operation is successful, and NRF 100 responds with a 201 Created message in line 5.

In line 6, NF producer 200 transmits an NF register request to NRF 100 to register its NF profile with NRF 100. The NF register service operation is successful, and NRF 100 responds with a 201 Created message in line 7.

In line 8, NRF 100 transmits an nfStatusNotify message to SEPP 126 to notify SEPP 126 of the NF profile registrations. SEPP 126 receives the nfStatusNotify message, reads the NF profile information from the NFStatusNotify message, and automatically creates one or more Category 1 message filtering rules based on the NF profile information. For example, if the NF profile includes an allowed information per NF type parameter, SEPP 126 may automatically create a Category 1 message filtering rule to allow the specified operations for the identified NF type.

In line 6, NF producer 200 transmits an NF register request to NRF 100 to register its NF profile with NRF 100. The NF register service operation is successful, and NRF 100 responds with a 201 Created message in line 7.

In line 8, NRF 100 transmits an nfStatusNotify message to SEPP to notify SEPP 126 of the NF profile registration. SEPP 126 receives the nfStatusNotify message, reads the NF profile information from the nfStatusNotify message, and automatically creates a Category 1 message filtering rule based on the NF profile information. For example, if the NF profile information includes an allowedOperationsPerNfType attribute defined for either of producer NFs 200 or 202, SEPP 126 may automatically create one or more Category 1 message filtering rules to allow the specified operations for the identified NF type(s). In line 9, SEPP 126 responds to the notification request with a 200 OK message.

In line 10, a foreign PLMN 204 transmits an SBI request message requesting service from one of the NFs in the PLMN protected by SEPP 126. In this example, the message is assumed to be blocked by a Category 1 message filtering rule. SEPP 126 responds as indicated in line 11 with an SBI response message indicating that the message has been blocked.

In line 12, the operator updates the profiles of NFs 200 and 202. NFs 200 and 202 update their profiles with NRF 100 using the NFUpdate service operation (not shown in FIG. 3). In line 13, NRF 100 transmits an nfStatusNotify request message to SEPP 126 containing the updated NF profile information. SEPP 126, in response to receiving the updated NF profile information, automatically updates one or more Category 1 message filtering rules with the updated NF profile information. For example, if the updated NF profile information adds additional allowed operations for an NF type or NF instance, SEPP 126 may add corresponding message filtering rules to its database of Category 1 message filtering rules to allow HTTP messages of the corresponding HTTP method type. In line 14, SEPP 126 responds to the notification request message in line 13.

Figure 4:
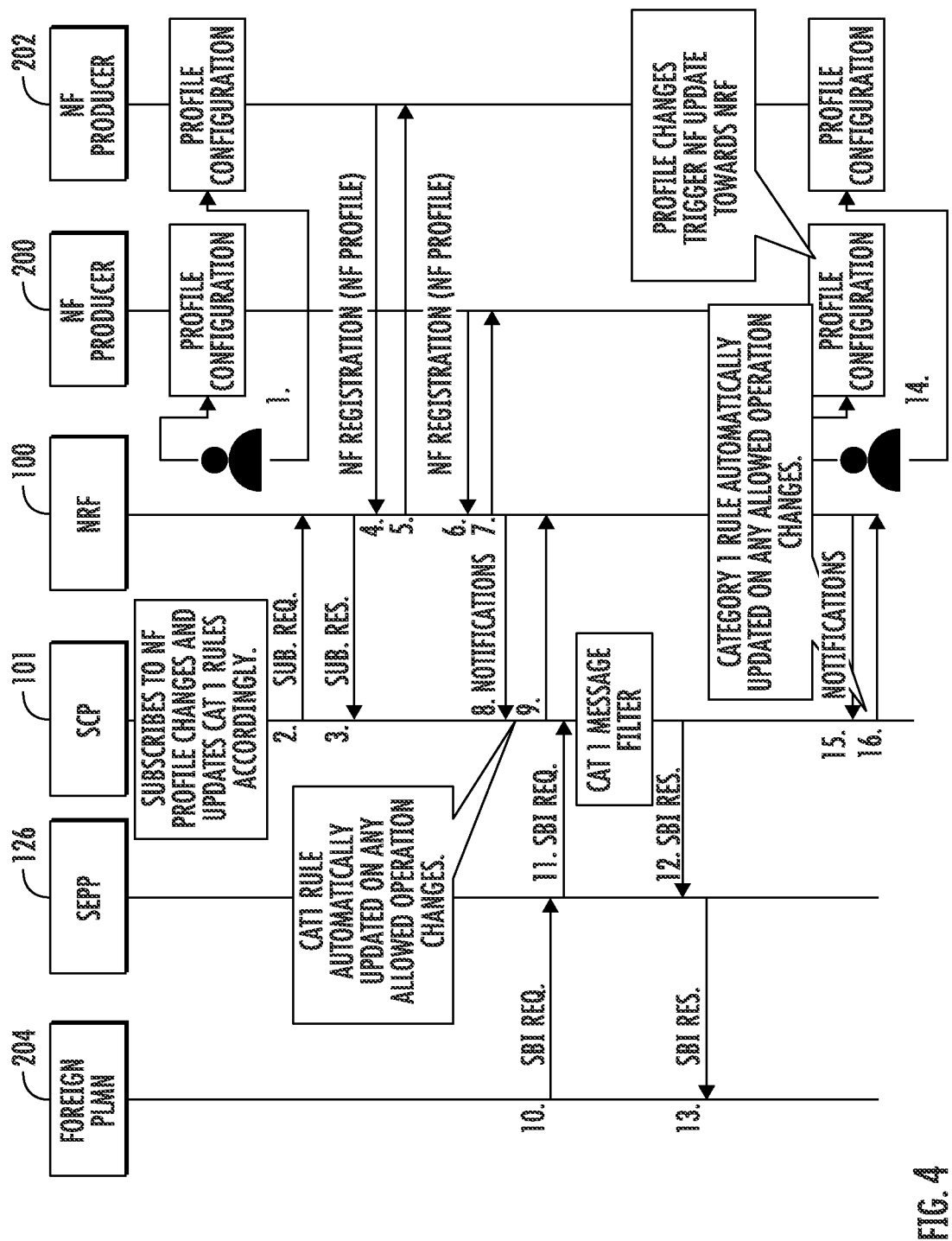
FIG. 4 is a message flow diagram illustrating automatic configuration of Category 1 message filtering rules at the SCP by learning topology information from the NRF.

The subject matter described herein is not limited to automatically configuring and using Category 1 message filtering rules at SEPP. In an alternate implementation, an SCP may automatically configure and use Category 1 message filtering rules. FIG. 4 is a message flow diagram illustrating automatic configuration of Category 1 message filtering rules at the SCP by learning topology information from the NRF. Referring to FIG. 4, in line 1, a network operator manually configures the NF profiles of NF producers 200 and 202. In line 2, SCP 101 transmits an nfStatusSubscribe message to NRF 100 to subscribe to receive notification of changes in NF profiles maintained by NRF 100. In line 3, NRF 100 responds with a 201 Created message indicating successful creation of the subscription.

In line 4, NF producer 202 transmits an NF register request to NRF 100 to register its NF profile with NRF 100. The NF register service operation is successful, and NRF 100 responds with a 201 Created message in line 5.

In line 6, NF producer 200 transmits an NF register request to NRF 100 to register its NF profile with NRF 100. The NF register service operation is successful, and NRF 100 responds with a 201 Created message in line 7.

In line 8, NRF 100 transmits an nfStatusNotify message to SCP 101 to notify SCP 101 of the NF profile registrations. SCP 101 receives the nfStatusNotify message, reads the NF profile information from the NFStatusNotify message, and automatically creates one or more Category 1 message filtering rules based on the NF profile information. For example, if the NF profile information includes an allowedOperationsPerNfType attribute, SCP 101 may automatically create one or more Category 1 message filtering rules to allow the specified operations for the identified NF type(s).

In line 6, NF producer 200 transmits an NF register request to NRF 100 to register its NF profile with NRF 100. The NF register service operation is successful, and NRF 100 responds with a 201 Created message in line 7.

In line 8, NRF 100 transmits an nfStatusNotify message to SCP 101 to notify SCP 101 of the NF profile registration in line 6. SCP 101 receives the nfStatusNotify message, reads the NF profile information from the nfStatusNotify message, and automatically creates one or more Category 1 message filtering rules based on the NF profile information. For example, if the NF profile includes an allowedOperationsPerNfType attribute, SCP 101 may automatically create a Category 1 message filtering rule to allow the specified operations for the identified NF type(s). In line 9, SCP 101 responds to the notification request with a 200 OK message.

In line 10, a foreign PLMN 204 transmits an SBI request message requesting service from one of the NFs in the PLMN protected by SEPP 126. In line 11, SEPP 126 forwards the message to SCP 101 for routing within the PLMN. SCP 101 applies its Category 1 message filtering rules to determine whether to allow or block the message. In this example, the message is assumed to be blocked by a Category 1 message filtering rule (or not allowed by the presence of a Category 1 message filtering rule with an action of "allow"). SCP 101 responds as indicated in line 12 with an SBI response message indicating that the message has been blocked. In line 13, SEPP 126 sends the response to foreign PLMN 204.

In line 14, the operator updates the profiles of NFs 200 and 202. NFs 200 and 202 update their profiles with NRF 100 using the NFUpdate service operation (not shown in FIG. 4). In line 15, NRF 100 transmits an nfStatusNotify request message to SCP 101 containing the updated NF profile information. SCP 101, in response to receiving the updated NF profile information, automatically updates one or more Category 1 message filtering rules with the updated NF profile information. For example, if the updated NF profile information adds additional allowed operations for an NF type or NF instance, SCP 101 may add corresponding message filtering rules to its database of Category 1 message filter rules to allow HTTP messages of the corresponding method type. In line 16, SCP 101 responds to the notification message in line 15.

Figure 5:
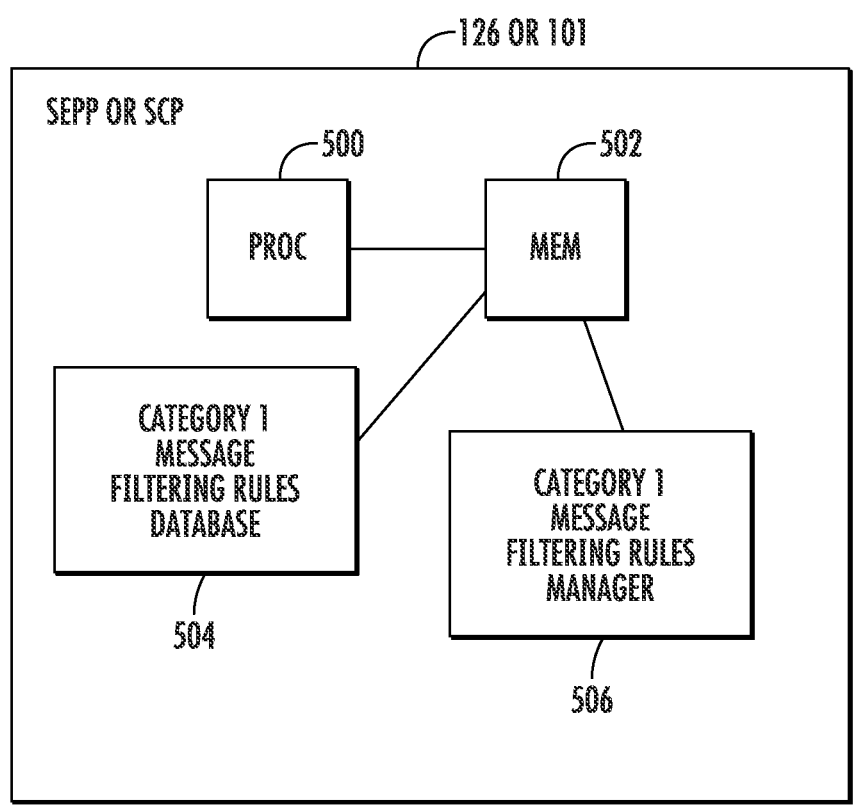
FIG. 5 is a block diagram illustrating an exemplary architecture for an SEPP or SCP for performing automatic configuration of Category 1 message filtering rules.

FIG. 5 is a block diagram illustrating an exemplary architecture for an SEPP or SCP for performing automatic configuration of Category 1 message filtering rules. In FIG. 5, SEPP or SCP 126 or 101 includes at least one processor 500 and a memory 502. SEPP or SCP 126 or 101 further includes a Category 1 message filtering rules database 504 that may be stored in memory 502. SEPP or SEPP 126 or 101 further includes a Category 1 message filtering rules manager 506 that performs the steps described herein for subscribing with the NRF to receive notification of NF profile updates, automatically generating Category 1 message filter rules, and using the rules to filter SBI messages. In one example, Category 1 message filtering rules manager 506 may be implemented using computer executable instructions stored in memory 502 and executed by processor 500.

Figure 6:
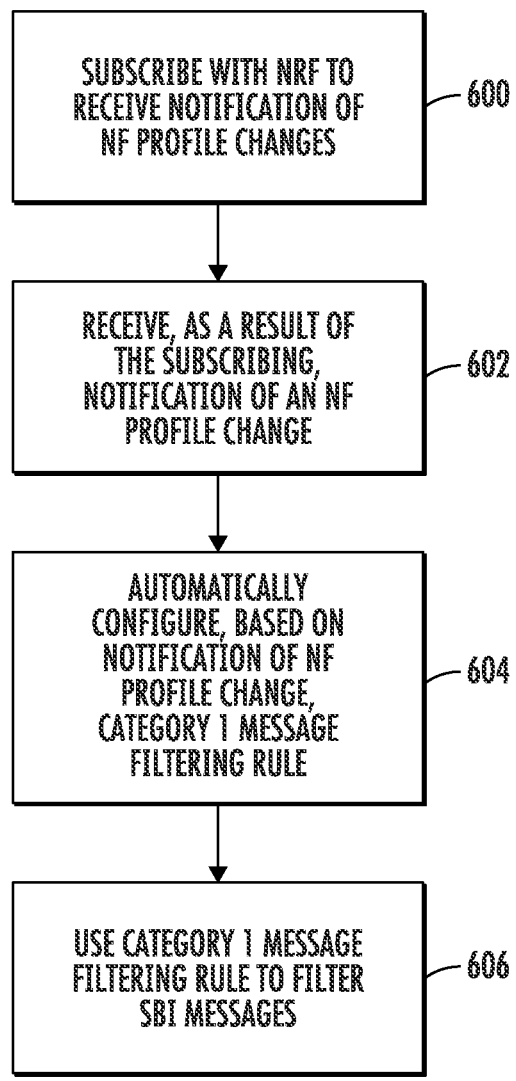
FIG. 6 is a flow chart illustrating an exemplary process for automatic configuration and use of Category 1 message filtering rules.

FIG. 6 is a flow chart illustrating an exemplary process for automatic configuration of Category 1 message filtering rules using topology information learned from the NRF. Referring to FIG. 6, in step 600, the process includes, at an NF, subscribing, with the NRF, to receive notification of NF profile changes. For example, SEPP 126 or SCP 101 may transmit an nfStatusSubscribe message to NRF 100 with subscription data for an NF or group of NFs for which SEPP 126 or SCP 101 wishes to receive notification of NF profile changes. In one example, SEPP 126 or SCP 101 may subscribe to receive notification of NF profile changes of all producer NFs within a PLMN.

In step 602, the process includes receiving, from the NRF and as a result of the subscribing, notification of an NF profile change. For example, SEPP 126 or SCP 101 may receive an nfStatusNotify request from NRF 100 in response to an NFRegister, NFUpdate, or NFDeregister service operation performed by an NF within the PLMN. The nfStatusNotify request may include new or updated NF profile information for an NF or group of NFs.

In step 604, the process includes automatically configuring, based on the notification of the NF profile change, at least one Category 1 message filtering rule implemented at the NF. For example, SEPP 126 or SCP 101 may extract allowed scopes from allowedOperationsPerNfType, allowedOperationsPerNfInstance, or other authorization attribute and generate Category 1 message filtering rules to allow messages having the scopes defined for the authorized entities. For example, if the allowed scope is write access for AMFs on a given interface, the Category 1 message filtering rule may indicate that HTTP POST, PUT, or PATCH methods are allowed for NF type=AMF.

In step 606, the process includes, using, at the NF, the at least one Category 1 message filtering rule to filter SBI messages. For example, SEPP 126 or SCP 101 may receive SBI requests, compare the NF instance and/or NF type information and the HTTP method type of the SBI requests to the Category 1 message filtering rules. When SEPP 126 or SCP 101 detects a match between the SBI request message parameters and one of the rules, SEPP 126 or SCP 101 may perform the corresponding rule action, which may be to allow or block the message.

Exemplary advantages of the subject matter described herein include a reduction in operational overhead over manual Category 1 message filtering rule configuration. Category 1 message filtering rules are automatically kept in sync with the producer NF provided resource URI and HTTP method type. The subject matter described herein also improves security by reducing manual errors in rule configuration. Another advantage is that obtaining updated Category 1 message filtering rules through the nfStatusSubscribe service operation is easy to implement, as this is an existing 3GPP service operation.

The disclosure of each of the following references is hereby incorporated herein by reference in its entirety.

REFERENCES 1. 3rd Generation Partnership Project; Technical Specification Group Core Network and Terminals; 5G System; Network Function Repository Services; Stage 3 (Release 17) 3GPP TS 29.510 V17.6.0 (2022-06)'
2. 3rd Generation Partnership Project; Technical Specification Group Services and System Aspects; System architecture for the 5G System (5GS); Stage 2; (Release 17) 3GPP TS 23.501 V17.5.0 (2022-06)
3. 3rd Generation Partnership Project; Technical Specification Group Services and System Aspects; Procedures for the 5G System (5GS); Stage 2; (Release 17) 3GPP TS 23.502 V17.5.0 (2022-06)
4. 3rd Generation Partnership Project; Technical Specification Group Core Network and Terminals; 5G System, Public Land Mobile Network (PLMN) Interconnection; Stage 3 (Release 17) 3GPP TS 29.573v17.5.0 (2022-06)
5. 5G Interconnect Security, Version 2.0 GSMA FS.36 (3 Jun. 2021)
6. OAuth2.0; https://swagger.io/docs/specification/authentication/oauth2/ (2022).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for automatic configuration and use of Category 1 message filtering rules, the method comprising:
at a security edge protection proxy (SEPP) or a service communication proxy (SCP):
subscribing, with an NF repository function (NRF), to receive notification of NF profile changes;
receiving, from the NRF and as a result of the subscribing, notification of an NF profile change;
automatically configuring, based on the notification of the NF profile change, at least one Category 1 message filtering rule, wherein the NF profile includes an authorization attribute and wherein automatically configuring the at least one Category 1 message filtering rule includes adding or updating a Category 1 message filtering rule to allow service based interface (SBI) messages containing hypertext transfer protocol (HTTP) methods corresponding to allowed scopes for an entity defined in the authorization attribute; and
using, at the NF, the at least one Category 1 message filtering rule to filter the SBI messages, wherein using the at least one Category 1 message filtering rule to filter SBI messages includes receiving, from the entity, an SBI message containing an HTTP method that does not correspond to one of the allowed scopes for the entity, and, in response to determining that the HTTP method in the SBI message does not correspond to one of the allowed scopes for the entity, blocking the SBI message.

2. The method of claim 1 wherein the SEPP or SCP comprises the SEPP.

3. The method of claim 1 wherein the SEPP or SCP comprises the SCP.

4. The method of claim 1 wherein subscribing with the NRF includes transmitting an nfStatusSubscribe message to the NRF.

5. The method of claim 1 wherein receiving notification of the NF profile change includes receiving an nfStatusNotify message containing an NF profile.

6. The method of claim 1 wherein receiving notification of the NF profile change includes receiving the notification in response to an NFRegister, NFUpdate, or NFDeregister service operation.

7. The method of claim 1 wherein the scopes define allowed operations for the entity.

8. The method of claim 1 wherein automatically configuring the at least one Category 1 message filtering rule includes automatically adding a Category 1 message filtering rule to a Category 1 message filtering rules database maintained by the NF.

9. The method of claim 1 wherein using the Category 1 message filtering rule to filter SBI messages includes allowing or blocking messages arriving in a public land mobile network (PLMN) based on hypertext transfer protocol (HTTP) method type and resource uniform resource identifier (URI) parameters in the messages.

10. A system for automatic configuration and use of Category 1 message filtering rules, the system comprising:
a security edge protection proxy (SEPP) or a service communication proxy (SCP) including at least one processor and a memory;
a Category 1 message filtering rules database stored in the memory; and
a Category 1 message filtering rules manager executable by the at least one processor for subscribing, with an NF repository function (NRF), to receive notification of NF profile changes, receiving, from the NRF and as a result of the subscribing, notification of an NF profile change, automatically configuring, based on the notification of the NF profile change, at least one Category 1 message filtering rule in the Category 1 message filtering rules database; and using the at least one Category 1 message filtering rule to filter service based interface (SBI) messages, wherein the NF profile includes an authorization attribute, wherein automatically configuring the at least one Category 1 message filtering rule includes adding or updating a Category 1 message filtering rule to allow SBI messages containing hypertext transfer protocol (HTTP) methods corresponding to allowed scopes for an entity defined in the authorization attribute, and wherein using the at least one Category 1 message filtering rule to filter SBI messages includes receiving, from the entity, an SBI message containing an HTTP method that does not correspond to one of the allowed scopes for the entity, and, in response to determining that the HTTP method in the SBI message does not correspond to one of the allowed scopes for the entity, blocking the SBI message.

11. The system of claim 10 wherein the SEPP or SCP comprises the SEPP.

12. The system of claim 10 wherein SEPP or SCP comprises the SCP.

13. The system of claim 10 wherein the Category 1 message filtering rules manager is configured to subscribe with the NRF by transmitting an nfStatusSubscribe message to the NRF.

14. The system of claim 10 wherein the Category 1 message filtering rules manager is configured to receive the notification of the NF profile change in an nfStatusNotify message containing an NF profile.

15. The system of claim 11 the Category 1 message filtering rules manager is configured to receive the notification of the NF profile change in response to an NFRegister, NFUpdate, or NFDeregister service operation.

16. The system of claim 1 wherein the scopes define allowed operations for the entity.

17. The system of claim 10 wherein the Category 1 message filtering rules manager is configured to allow or block messages arriving in a public land mobile network (PLMN) based on hypertext transfer protocol (HTTP) method type and resource uniform resource identifier (URI) parameters in the messages.

18. A non-transitory computer readable medium having stored thereon executable instructions that when executed by a processor of a computer control the computer to perform steps comprising:
    at a security edge protection proxy (SEPP) or a service communication proxy (SCP):
    subscribing, with an NF repository function (NRF), to receive notification of NF profile changes;
    receiving, from the NRF and as a result of the subscribing, notification of an NF profile change;
    automatically configuring, based on the notification of the NF profile change, at least one Category 1 message filtering rule, wherein the NF profile includes an authorization attribute and wherein automatically configuring the at least one Category 1 message filtering rule includes adding or updating a Category 1 message filtering rule to allow service based interface (SBI) messages containing hypertext transfer protocol (HTTP) methods corresponding to allowed scopes for an entity defined in the authorization attribute; and
    using, at the NF, the at least one Category 1 message filtering rule to filter the SBI messages, wherein using the at least one Category 1 message filtering rule to filter SBI messages includes receiving, from the entity, an SBI message containing an HTTP method that does not correspond to one of the allowed scopes for the entity, and, in response to determining that the HTTP method in the SBI message does not correspond to one of the allowed scopes for the entity, blocking the SBI message.

* * * * *